324-77 CROSS REFERENCE SEARCH ROOM

March 4, 1969 R. H. JAMES ETAL 3,431,492
TRANSIENT SIGNAL RECORDING SYSTEM UTILIZING DIFFERENT FREQUENCY RECORDING DRIVERS INCLUDING MEANS FOR SAMPLING DIFFERENT PORTIONS OF THE TRANSIENT SIGNAL AT DIFFERENT FREQUENCIES
Filed Sept. 14, 1966 Sheet 1 of 2

INVENTORS
RAYMOND H. JAMES
VINCENT J. KORKOWSKI
PHILIP J. NISTLER
BY Thomas J. Nikolai
ATTORNEY TRANSIENT SIGNAL RECORDING SYSTEM UTILIZING DIFFERENT FREQUENCY RECORDING DRIVERS INCLUDING MEANS FOR SAMPLING DIFFERENT PORTIONS OF THE TRANSIENT SIGNAL AT DIFFERENT FREQUENCIES Filed Sept. 14, 1966

United States Patent Office 3,431,492
Patented Mar. 4, 1969

3,431,492

TRANSIENT SIGNAL RECORDING SYSTEM UTILIZING DIFFERENT FREQUENCY RECORDING DRIVERS INCLUDING MEANS FOR SAMPLING DIFFERENT PORTIONS OF THE TRANSIENT SIGNAL AT DIFFERENT FREQUENCIES

Raymond H. James, Bloomington, Vincent J. Korkowski, Minneapolis, and Philip J. Nistler, Bloomington, Minn., assignors to Sperry Rand Corporation, New York, N.Y., a corporation of Delaware

Filed Sept. 14, 1966, Ser. No. 579,404
U.S. Cl. 324—102 10 Claims
Int. Cl. G01r *27/28, 23/16;* G01d *9/04*

Figure 1:
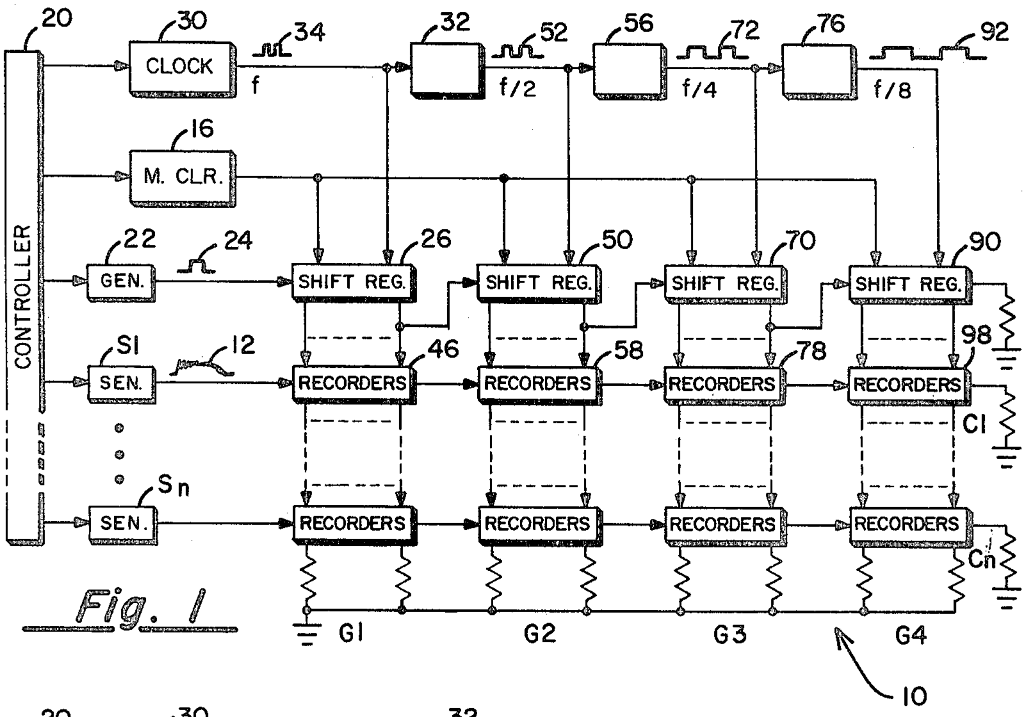

The present invention relates in general to analog recording systems and in particular to a multichannel recording system that utilizes a plurality of different frequency recording drivers.

The preferred embodiment of the present invention is concerned with the recording of the amplitude of an elemental sample of a transient electrical signal in a recording device, one sample per recording device. The samples, when later read out at the recording frequency define the transient signal waveform. In the preferred embodiment of the present invention the transient signal is coupled to an associated channel of associated recording devices which channel of recorders is arranged in a plurality of predetermined groups of recorders. Each group of recorders is driven by an associated strobe driver which strobe driver is in turn driven by an associated fequency driver at a predetermined frequency, which frequency may be different for each group of recorders of the channel. A plurality of channels are coupled in parallel to the strobe drivers forming a multichannel recording system whereby a plurality of transient signals may be recorded in parallel at predetermined recording frequencies in like-ordered parallel-arranged recorders of the parallel-arranged channels. The recorders of the present invention may be any well known type of recorders or may be of the types disclosed in the copending applications of R. A. White et al., Ser. No. 456,365, filed May 17, 1965; R. H. James, Ser. No. 321,909, filed Nov. 6, 1963; and, C. W. Lundberg et al., Ser. No. 351,413, filed Mar. 12, 1964, which applications are assigned to the Sperry Rand Corporation as is the present application.

In the above referenced application of R. A. White et al. there is provided a multichannel recording system utilizing magnetic elements as the recording devices. The recorders of such system are arranged in serial strings, or channels, each as defined by an associated transient signal source. The like-ordered recorders of the parallel-arranged channel are driven by interlaced shift registers functioning as strobe drivers. These shift registers emitted strobe pulses that sample the parallel flowing transient signals at the frequency of the interlaced shift registers. This system samples the transient signals at a predetermined and constant frequency over the duration of the recording operation. This system is satisfactory if the portions of the transient signals to be sampled are in a relatively short section of interest or wherein a fixed sampling frequency is applicable. However, if the transient signals to be sampled consist of two or more relatively short portions of interest having a rapidly fluctuating amplitude that are separated by a relatively long duration portion of little interest having a relatively static amplitude many recorders are effectively wasted by recording relatively static and undesired data. Alternatively, the sampling frequencies may be made longer than desired so as to span the entire transient signal; but this provides samples, due to the large separation between the areas of rapid amplitude fluctuations in the areas of interest, that may not define the areas of interest with sufficient accuracy. Accordingly, it is desirable to provide a system whereby, with transient signals of generally known characteristics there is achieved a high frequency sample rate in an aera of rapidly fluctuating amplitude and a low frequency sampling rate in an area of relatively constant amplitude.

Accordingly, it is a general object of the present invention to provide an analog recording system that is capable of recording different portions of a transient electrical signal at different frequencies.

It is a further object of the present invention to provide a multichannel analog recording system wherein the frequency of recording selected portions of such signals are fixed but different.

These and other more detailed and specific objectives will be disclosed in the course of the following specification, reference being had to the accompanying drawings.

With particular reference to FIGURE 1 there is presented an illustration of the preferred embodiment of the analog recording system 10 of the present invention. System 10 includes a plurality of channels C1 through C*n* each of which channels includes a plurality of groups G1 through G4. Each of the groups G1 through G4 includes a plurality of analog recording devices which for the purposes of the present invention may be assumed to be similar to that disclosed in the copending application of F. G. Hewitt, Ser. No. 386,823, filed Aug. 3, 1964. The recording technique of such copending application involves the establishment of a predeterminably variable flux level in a magnetizable memory device which flux level is representative of the amplitude of an incremental portion, or sample, of a transient electrical signal. In such a device an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the state of the magnetic device from a first saturated state to a second and opposite saturated state but is of such a limited duration so as to preclude such complete flux reversal. However, such duration is sufficient to set the flux level into an intermediate time-limited flux state. Different incremental portions of the transient signal may be gated in the magnetic device by delaying the transient signal different time increments with respect to the strobe pulse; each different time delay increment of the transsient signal is gated by the strobe pulse into a separate magnetic device so that each separate magnetic device stores a flux level that is representative of the net magnetomotive force effect of the strobe pulse and that portion of the transient signal gated by the strobe pulse. The terms "signal," "pulse," etc., when used herein shall be used interchangeably to refer to the current signal that produces the correspondingly magnetic field and to the magnetic field produced by the corresponding current signal.

Figure 2:
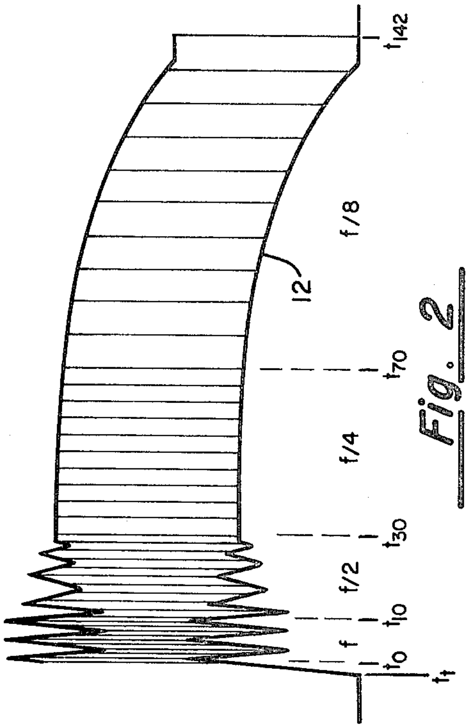

With particular reference to FIGURE 2 there is illustrated a typical transient signal 12 and superposed thereon a plurality of strobe pulses that serve a function similar to that disclosed with respect to the above mentioned F. G. Hewitt application. The illustration of FIG. 2 is presented to graphically illustrate the time-separation between the plurality of strobe pulses over the duration of signal 12, illustrating the use of the higher frequency strobe pulses, i.e., the higher frequency sampling rate, in those areas of signal 12 of rapidly fluctuating amplitude. As illustrated, as transient signal 12 increases in time duration the fluctuation in amplitude decreases with the apparent need for lower frequency samples thereof while still permitting sufficient samples to define the waveform of signal 12 over the period of interest.

Figure 3:
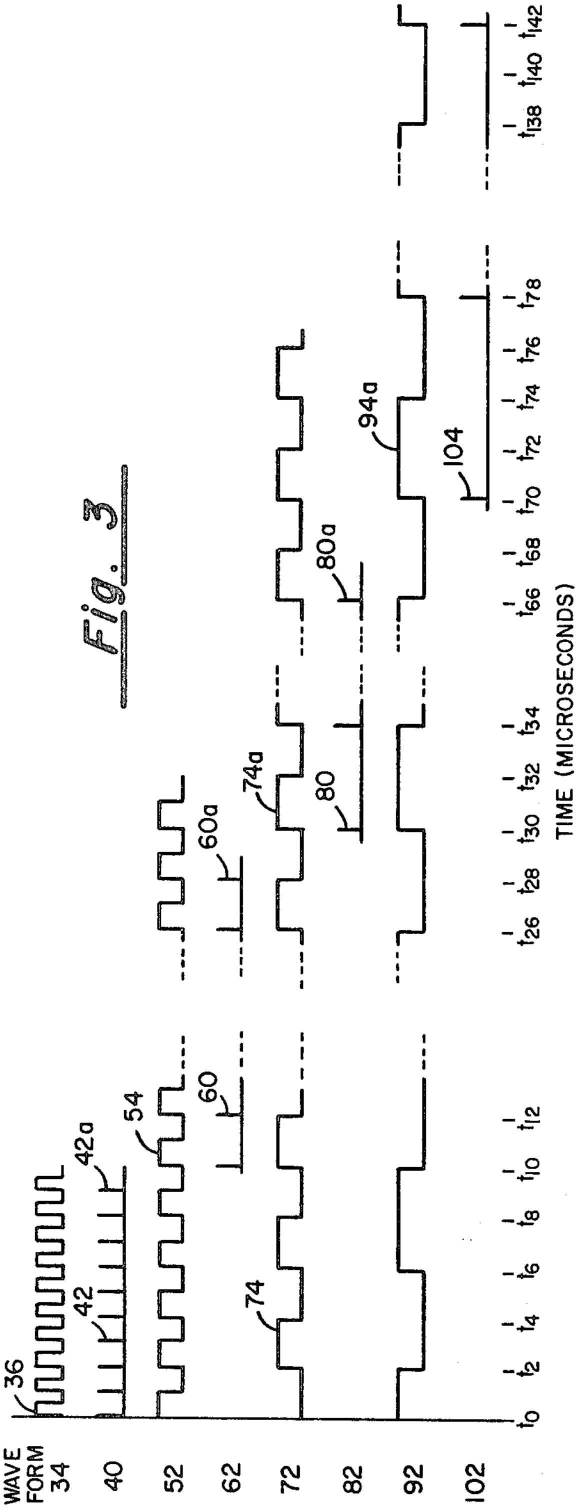

With particular reference to FIGURE 3 there is presented an illustration of a timing chart illustrating in detail the timing relationships between the components of FIG. 1 whereby the different frequency sampling of the particular transient signal may be effected.

With reference now to FIGURE 1 there is illustrated a plurality of recording channels C1 through C*n*. Each channel comprises a plurality of groups of analog recording devices serially coupled by an associated sensor that is a source of the particular transient signal to be sampled by the associated channel. In the illustrated embodiment, system 10 has the capability of sampling and storing *n* transient signals; a separate transient signal is associated with each channel C1 through C*n*.

As a source of strobe pulses, each group of parallel-arranged recorders has associated therewith a ten-stage shift register the outputs of which are coupled serially to like-ordered recorders of each of the parallel-arranged like-ordered groups, i.e., shift register 26 is coupled to the like-ordered recorders of the like-ordered groups G1 of channels C1 through C*n*. Each of the ten-stage shift registers operates in a well known manner, and, accordingly, no detailed description is provided therefor. A typical operation of a ten-stage shift register, as illustrated, is initiated by a master clear driver 16 operation for clearing all of the ten stages thereof. The stages are initially established, or cleared, into a first binary state usually designated a "0" state indicative of an insignificant signal being emitted from the outputs thereof when properly gated. After the master clear operation the first stage is set into a "1" by a suitable driver, such as a set generator 22, which set operation is a necessary and essential preliminary step to the operation thereof. Next, a suitable timing device, such as a source 30 of a master clocking signal, is coupled thereto which, upon the successive couplings of a clocking signal pulse thereto, progressively shifts the "1" therethrough from bit position 1 to bit position 10 causing a significant strobe pulse signal to be gated and emitted from its output lines upon each coupling of the clocking signal pulse. In the embodiment as illustrated the pulse signal emitted from the tenth bit of the ten-stage shift register is coupled in parallel to the succeeding ten-stage shift register which performs the function of the set generator 22 setting bit position 1 thereof into a logical "1" in preparation for the next subsequent clocking signal pulse to be coupled thereto upon which such succeeding ten-stage shift register will successively couple the strobe pulse signal indicative of a "1" to its output lines from its stages 1 through 10.

In order to effectuate the different frequency strobe pulses utilized by the different groups there is presented a master clocking signal source 30 that produces an output signal of frequency F which drives serially aligned frequency dividers, emitting therefrom successive signals of $F/2$, $F/4$ and $F/8$. The overall system is controlled by a controller 20 for the proper timing of the various control signals and the gating of the transient signals that are to be recorded in the *n* channels.

For purposes of the understanding of the operation of the exemplary embodiment of FIG. 1 the operation thereof shall be described with the use of transient signal 12 being sampled and recorded in channel C1 illustrated in FIG. 2 and having a timing sequence as illustrated in FIG. 3. Initially, it is assumed that all the recording devices, or recorders, of the channels *n* are set into a condition receptive to the storage of information; i.e., that all ten-stage shift registers are master cleared to contain all zeros, that the master clock is off, and that the plurality of sensors are coupling no transient signals to the associated channels.

With all components of FIG. 1 in their initial pre-recording state, controller 20 energizes set generator 22 causing it to couple a set pulse 24 to shift register 26 whereby its initial stage is set to a "1." Next, at a time $t_t$ controller 20 enables sensors S1 through S*n* enabling such sensors to couple the associated transient signal to the associated recording channel C1 through C*n*, respectively. Alternatively, if desired this enabling of sensors S1 through S*n* may be at time $t_0$ which is the time of which the recording operation is initiated as will be described below. The delay between the initiation of the coupling of the associated transient signals to their associated recording channels may be implemented by many means such as inserting delays in the associated lines between controller 20 and the first group of recording devices of the channel.

Next, at time $t_0$ controller 20 initiates the recording operation by initiating the 1 megacycle (mc.) master clock 30 that couples an output signal of frequency F to shift register 26 and frequency divider 32. Clock 30 establishes the basic sampling frequency of recording system 10 of FIG. 1 outputting waveform 34 of FIG. 3 which is a 1 megacycle clock signal of a 50% duty cycle generating successive pulses of 500 nanoseconds in duration. The initial pulse 36 of waveform 34 at time $t_0$ enables shift register 26 enabling it to emit waveform 40 which consists of a 1 megacycle signal of strobe pulses 42 each of approximately 50 nanoseconds (ns.) in duration. Each of the strobe pulses 42 of waveform 40 are emitted in a conventional serial manner from shift register 26 coupling like-ordered recorders of the analog recording groups G1 of channels C1 through C*n*. The recording technique of the particular sample portions of signal 12, as coupled to analog recording group 46 of channel C1, is exemplified in FIG. 2 wherein there is superimposed upon transient signal 12 the ten pulses 42 over the period $t_0$ through $t_9$. The details of the recording techniques in the particular analog recording devices of group 46 is described in detail in the above referenced F. G. Hewitt application and accordingly no detailed description shall be provided herein.

As described hereinabove, when shift register 26 emits from its tenth stage strobe pulse **42*a* of waveform 40 at time $t_9$—see FIG. 3—strobe pulse 42*a* is coupled to the set input of shift register 50 whereby its initial stage is set into a logical "1" in preparation for reception of clocking signal 52 of a frequency $F/2$ as illustrated in FIG. 3. Waveform 52, emitted from frequency divider 32 at time $t_0$, is coupled to frequency divider 56 and shift register 50. Pulse 54 of waveform 52 at time $t_{10}$ gates shift register 50 enabling shift register 50 to initiate a series of strobe pulses 60 as in waveform 62 of FIG. 3. Strobe pulses 60 are of a waveform similar to that of strobe pulses 42 of waveform 40 being of approximately 50 nanoseconds in duration but of two microseconds separation. As with the operation of shift register 26 each of the strobe pulses 60 of waveform 62 are emitted in a conventional serial manner from shift register 50** coupling like-ordered recorders of the analog recording groups G2 of channels C1 through C*n*. The ten pulses 60 emitted from shift register 50 over the period $t_{10}$ through $t_{28}$ record the associated samples of signal 12 in the associated recording devices of group 58 as exemplified by the ten pulses 60 superimposed upon signal 12 over the period $t_{10}$ through $t_{28}$ of FIG. 2.

As described hereinabove, when shift register 50 emits from its tenth stage strobe pulse **60*a* of waveform 62 at time $t_{28}$—see FIG. 3—strobe pulse 60*a* is copled to the set input of shift register 70 whereby its initial stage is set into a logical "1" in preparation for reception of clocking signal 72 of a frequency F/4 as illustrated in FIG. 3. Waveform 72, emitted from frequency divider 56 at time $t_0$, is coupled to frequency divider 76 and shift register 70. Pulse 74***a* of waveform 72 at time $t_{30}$ gates shift register 70 enabling shift register 70 to initiate a series of strobe pulses 80 as in waveform 82 of FIG. 3. Strobe pulses 80 are of a waveform similar to that of strobe pulses 42 of waveform 40 being approximately 50 nanoseconds in duration but of four microseconds separation. As with the operation of the shift register 26 each of the strobe pulses 80 of waveform 82 are emitted in a conventional serial manner from shift register 70 coupling like-ordered recorders of the analog recording group G3 of channels C1 through C*n*. The ten pulses 80 emitted from shift register 70 over the period $t_{30}$ through $t_{66}$ record the associated samples of signal 12 in the associated recording devices of group 78 as exemplified by the ten pulses 80 superimposed upon signal 12 over the period $t_{30}$ through $t_{66}$ of FIG. 2.

As described hereinabove when shift register 70 emits from its tenth stage strobe pulse 80*a* of waveform 82 at time $t_{66}$—see FIG. 3—strobe pulse 80*a* is coupled to the set input of shift register 90 whereby its initial stage is set into a logical "1" in preparation for reception of clocking signal 92 of a frequency F/8 as illustrated in FIG. 3. Waveform 92, emitted from frequency divider 76 at time $t_0$ is coupled to shift register 90. Pulse 94*a* of waveform 92 at time $t_{70}$ gates shift register 90 enabling shift register 90 to initiate a series of strobe pulses 104 of waveform 102 of FIG. 3. Strobe pulses 104 are of a waveform similar to that of strobe pulses 42 of waveform 40 being of approximately 50 nanoseconds in duration but of 8 microseconds separation. As with the operation of shift register 26 each of the strobe pulses 104 of waveform 102 are emitted in a conventional serial manner from shift register 90 coupling like-ordered recorders of the analog recording group G4 of channels C1 through C*n*. The ten pulses 104 emitted from shift register 90 over the period $t_{70}$ through $t_{142}$ record the associated samples of signal 12 in the associated recording devices of group 98 as exemplified by the ten pulses 102 superimposed upon signal 12 over the period $t_{70}$ through $t_{142}$ of FIG. 2.

Figure 4:
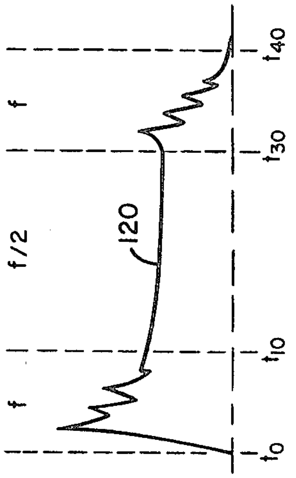

Although the illustrated embodiment of analog recording system 10 of FIG. 1 utilizes the serially aligned frequency drivers 30, 32, 56 and 76 each of which emits as an output signal a signal whose frequency is successively halved providing output signals of frequency F, F/2, F/4, and F/8, respectively, it is apparent that such arrangement is not to be construed as a limitation thereof. This chosen arrangement is particularly suited for an analog signal having a waveform similar to that of signal 12 wherein the area of interest having rapid amplitude fluctuations is in the initial portion of the analog signal and wherein the subsequent portions have substantially less amplitude fluctuations wherein the subsequent sampling frequencies may be of successively lower rates. However, assume a second analog signal 120 as in FIG. 4 wherein there are areas of interest of rapidly fluctuating amplitude of an initial and terminal portion separated by a portion of substantially constant amplitude. For the recording of a signal of such a waveform it is apparent that it would be desirable to provide relatively high sampling frequencies in the initial and terminal portions wherein the intermediate portions may be sampled by a relatively low frequency sampling rate. With particular reference to FIG. 4 there is represented an illustration of analog signal 120 having the particular characteristic of its waveform as described above. In this arrangement utilizing only three frequency drivers, such as drivers 30, 32 and 56 of FIG. 1, such frequency drivers would provide output signals of frequency F, F/2, and F, respectively, sampling signal 120 over a total duration of 40 microseconds. Accordingly, it is apparent that once the general waveform of the analog signal that is to be stored is known the particular recording frequency may be selected so as to provide a relatively high sampling frequency in the areas of rapid amplitude fluctuations and a relatively low sampling frequency in the areas of substantially constant amplitude.

Figure 5:
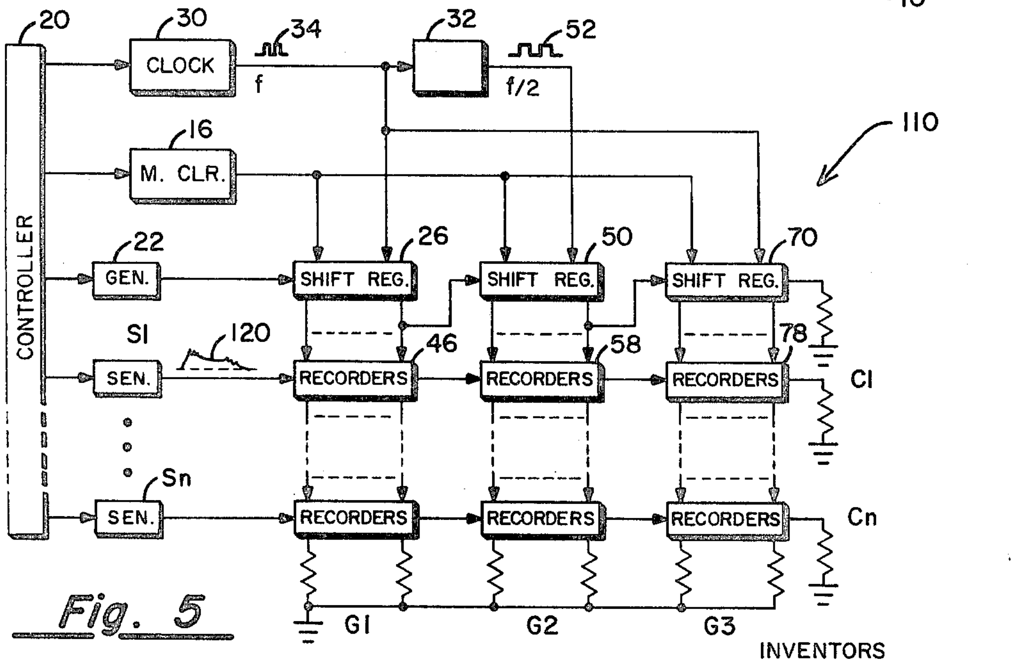

With particular reference to FIG. 5 there is presented an illustration of an analog recording system 110 that is a modification of the analog recording system 10 of FIG. 1 for the recording of a signal such as signal 120 of FIG. 4. As it is apparent in the discussion of the operation of the analog recording system of FIG. 1, that the one megacycle clock 30 establishes the timing of the sampling of the analog signals that are coupled to the associated rhannels, any one of the drivers 30, 32, 56 and 76 of the analog recording system 10 of FIG. 1 may be utilized to drive more than one associated shift register. Accordingly, in the embodiment of analog recording system 110 of FIG. 5 clocking means 30 is utilized to directly establish the operation frequency of frequency divider 32, and indirectly shift register 50, and shift registers 26 and 70. It is apparent in the similarity of the two analog recording systems 10 and 110 of FIGS. 1 and 5, respectively, that the operation of the illustrated embodiment of FIG. 5 would be similar to that of FIG. 1, and, accordingly, no detailed discussion of such operation shall be given here. However, analog recording system 110 is presented to show another embodiment of applicants' inventive concept wherein a master clock means drives a plurality of shift registers, either directly or through intermediate frequency modifying means, to establish the sampling frequency of one or more analog signals associated wtih the multichannel recording system.

It is apparent, therefore, that the present application has disclosed a multichannel recording system that utilizes a plurality of different frequency recording drivers to sample and store an analog signal at a predetermined plurality of sample times whereby upon readout of the recorded data the waveform of the analog signal may be reconstructed. It is understood that suitable modifications may be made in the structure as disclosed provided such modifications come within the spirit and scope of the appended claims. Having, now, therefore, fully illustrated and described our invention, what we claim to be new and desire to protect by Letters Patent is:

What is claimed is:

1. A recording system for the sampling of different portions of an electrical analog signal at different frequencies, comprising:
  - a plurality of groups of recording devices serially coupled for recording in each group a different portion of said analog signal;
  - a recording channel including:
    - sensor means for serially coupling said electrical analog signal to each of said groups of recording devices;
  - a plurality of strobe signal driver means, each generating sampling pulse signals for sampling an associated portion of said analog signals, a separate one of said strobe signal drive means coupled to an associated separate group of said plurality of groups of recording devices;
  - first, second and third clock signal means of different frequencies;
  - said first clock signal means coupled to said second clock signal means and to a first one of said strobe signal driver means for controlling the sampling frequency thereof and operable to cause an associated first portion of said analog signal to be recorded in the associated group of recording devices at a plurality of samples at the frequency of said first clock signal means;
  - said second clock signal means coupled to said third clock signal means and to a second one of said strobe signal driver means for controlling the sampling frequency thereof and operable to cause an associated second portion of said analog signal to be recorded in the associated group of recording devices at a plurality of samples at the frequency of said second clock signal means; and
  - said third clock signal means coupled to a third one of said strobe signal driver means for controlling the sampling frequency thereof and operable to cause an associated third portion of said analog signal to be recorded in the associated group of recording devices at a plurality of samples at the frequency of said third clock signal means.

2. The recording system of claim 1 wherein each of said strobe signal driver means includes a shift register.

3. The recording system of claim 2 wherein the shift register of each of said strobe signal driver means has *n* stages and wherein the *n*th stage of the shift register of at least said first and second strobe signal driver means enables the shift register of the next subsequent strobe signal driver means to emit strobe signals when gated by the next suceeding pulse coupled thereto by its associated clock signal means.

4. The recording system of claim 3 wherein said first, second and third clock signal means emit clock signals of frequencies $F/1$, $F/2$ and $F/4$, respectively.

5. The recording system of claim 4 wherein each strobe signal is coupled to a separate recording device of the associated group of recording devices.

6. The recording system of claim 1 further including a plurality of said recording channels wherein like-ordered groups of recording devices of each channel are arranged in a parallel manner for coupling each strobe signal to a separate, like-ordered, recording device of each like-ordered group of recording devices of said recording channels.

7. A recording system for the sampling of different portions of an electrical analog signal at different frequencies, comprising:

a plurality of groups of recording devices serially coupled for recording in each group a different portion of said analog signal;

a recording channel including:

sensor means for serially coupling said electrical analog signal to each of said groups of recording devices;

a plurality of strobe signal driver means each generating sampling pulse signals for sampling an associated portion of said analog signal, a separate one of said strobe signal driver means coupled to an associated separate group of said plurality of groups of recording devices;

first and second clock signal means of different frequencies;

said first clock signal means coupled to said second clock signal means;

said first and second clock signal means coupled to associated ones of said strobe signal driver means for controlling the sampling frequency thereof and operable to cause an associated portion of said analog signal to be recorded in the associated group of recording devices at a plurality of samples at the frequency of said first and second clock signal means.

8. The recording system of claim 7 wherein each of said strobe signal driver means includes a shift register.

9. The recording system of claim 8 wherein the shift register of each of said strobe signal driver means has *n* stages and wherein the *n*th stage of the shift register of at least said first strobe signal driver means is coupled to the shift register of the next subsequent strobe signal driver means for enabling it to emit strobe signals when gated by the next succeeding pulse coupled thereto by its associated clock signal means.

10. The recording system of claim 9 further including a plurality of said recording channels wherein like-ordered groups of recording devices of each channel are arranged in a parallel manner for coupling each strobe signal to a separate recording device of each like-ordered group of recording devices of said recording channels.

References Cited

UNITED STATES PATENTS

| | | | |
|---|---|---|---|
| 2,516,888 | 8/1950 | Levy | 328—55 XR |
| 2,676,202 | 4/1954 | Filipowsky. | |
| 2,824,172 | 2/1958 | Cherry | 328—151 XR |
| 3,006,991 | 10/1961 | Cherry et al. | 178—6 |
| 3,124,746 | 3/1964 | Strathman | 324—77 |
| 3,157,745 | 11/1964 | Maezono | 179—15.55 |
| 3,278,846 | 10/1966 | Patten et al. | 234—77 |
| 3,293,555 | 12/1966 | Mazure et al. | 328—151 XR |
| 3,299,204 | 1/1967 | Cherry et al. | 178—6 |
| 3,334,306 | 8/1967 | Jensen | 307—235 XR |
| 3,373,411 | 3/1968 | James | 340—174 |

RUDOLPH V. ROLINEC, *Primary Examiner.*

G. R. STRECKER, *Assistant Examiner.*

U.S. Cl. X.R.

324—77; 328—151; 346—44